(12) United States Patent
Reinhard et al.

(10) Patent No.: US 6,199,796 B1
(45) Date of Patent: Mar. 13, 2001

(54) ADAPTIVE PNEUMATIC WING FOR FIXED WING AIRCRAFT

(75) Inventors: Andreas Reinhard, Zürich; Frederick E. To, Gondiswil; Otto Ramseier, Grenchen; Res Kammer, Rubingen, all of (CH)

(73) Assignee: Prospective Concepts AG, Zollikon (CH)

( * ) Notice: Subject to any disclaimer, the term of this patent is extended or adjusted under 35 U.S.C. 154(b) by 0 days.

(21) Appl. No.: 09/043,527

(22) PCT Filed: May 14, 1997

(86) PCT No.: PCT/CH97/00190

§ 371 Date: Jun. 29, 1998

§ 102(e) Date: Jun. 29, 1998

(87) PCT Pub. No.: WO98/03398

PCT Pub. Date: Jan. 29, 1998

(30) Foreign Application Priority Data

Jul. 18, 1996 (CH) .................................................. 1799/96

(51) Int. Cl.⁷ ...................................................... B64C 3/00
(52) U.S. Cl. ...................... 244/35 R; 244/201; 244/218; 244/219
(58) Field of Search .................................. 244/35 R, 201, 244/218, 219

(56) References Cited

U.S. PATENT DOCUMENTS

| 2,886,265 | 5/1959 | Ritter et al. | 244/117 |
| 2,979,827 | * 4/1961 | Ross | 244/44 |
| 3,106,373 | 10/1963 | Bain et al. | 244/117 |
| 3,473,761 | 10/1969 | Chutter | 244/119 |
| 3,481,569 | 12/1969 | Bell | 244/123 |
| 3,957,232 | 5/1976 | Sebrell | 244/123 |
| 4,261,534 | * 4/1981 | Roselli | 244/22 |
| 4,725,021 | 2/1988 | Priddy | 244/123 |
| 5,474,257 | * 12/1995 | Fisher et al. | 244/49 |
| 5,775,249 | * 7/1998 | Samuel | 114/103 |

FOREIGN PATENT DOCUMENTS

| 683250 | * 2/1994 | (CH) . |
| 949920 | 9/1956 | (DE) . |
| 3707463 | * 10/1987 | (DE) . |
| 615112 | * 1/1949 | (GB) . |
| 835221 | * 5/1960 | (GB) . |
| 2165513 | * 10/1984 | (GB) . |

* cited by examiner

Primary Examiner—J. Woodrow Eldred
(74) Attorney, Agent, or Firm—Jenkens & Gilchrist, P. C.

(57) ABSTRACT

An adaptive pneumatic wing for a fixed wing aircraft having an airtight envelope (8) defined by a top skin (1) and a bottom skin (2) subdivided internally by a plurality of cells extending longitudinally of the wing, portions of the cells being airtight forming wing structure adapted to provide an aileron function, a landing flap function, and to change the shape of the wing profile.

34 Claims, 5 Drawing Sheets a)

b)

ADAPTIVE PNEUMATIC WING FOR FIXED WING AIRCRAFT

Figure 1:
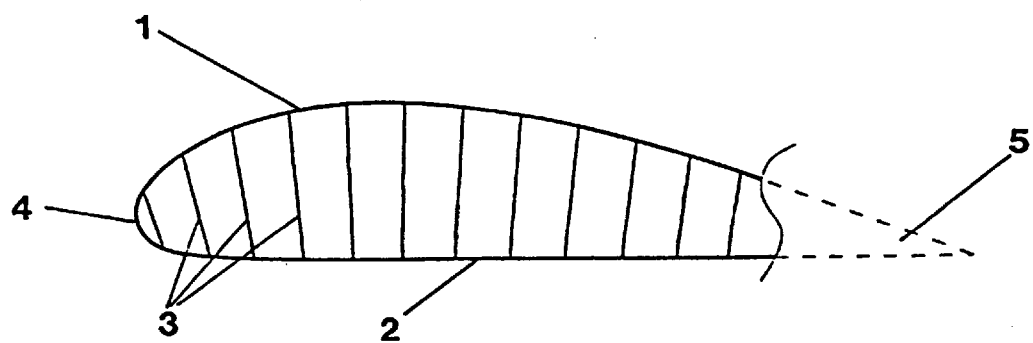

The present invention relates to a pneumatic, so-called adaptive wing, i.e. inflated by compressed air and modifiable in form by the applied effects of compressed air in accordance with the preamble to claim 1.

Pneumatic wings as such have been variously proposed and are known, for example from two groups of documents: the first group describes wing structures, which are built up from a plurality of tubular elements: U.S. Pat. No. 3,473,761, U.S. Pat. No. 4,725,021 and U.S. Pat. No. 3,957,232; the wing structures of the other group are kept in shape by distance-threads and textile straps (so-called "webs"): DE 949 920, U.S. Pat. No. 2,886,265, U.S. Pat. No. 3,106,373 and U.S. Pat. No. 3,481,569.

Pneumatic adaptive wings are not known from the Patent literature.

Pneumatic wings in themselves fulfil a rational technical need only if they provide advantages in respect of weight, production costs, simplicity of handling and flight characteristics over other, non-pneumatic, forms of construction and can also be folded in non-operational circumstances; these named advantages do not need to be present in all the quoted areas; an overall evaluation should, however, make a pneumatic wing appear advantageous. If we evaluate the documents in the first group, then a pneumatic wing according to U.S. Pat. No. 3,473,761 appears heavy, complicated and expensive to produce and, which weighs most heavily, is ill suited to solve the static problems of a wing. The wing according to U.S. Pat. No. 3,957,232 is—in contrast to the previous example—constructed of pressure tubes with a large cross section. The proposed device is however not suitable for creating the necessary circulation or surface tension in the wing skin, or suffers from deformations, which are not shown or mentioned. If, however, one takes these deformations of the pressure tubes into account, then it can be seen that the construction is heavy and, in the loaded method of construction, not very stable. In the third description, only a spar structure is constructed from pneumatic elements; the remainder of the wing receives its shape from sail battens.

The wings or profiles, which are known from the second group of documents, are basically constructed of under and over skins and the strings or webs which connect the two elements. The solution known from U.S. Pat. No. 3,106,373 differs from the others in so far as the whole wing envelope comprises an airtight distance web, which is bent and glued into the required shape. The problems of this group comes out most clearly from DE 949 920.

The wing profile is there symmetrical. The necessary aerodynamic lift ($c_A$) for a wing—whether it be a carrying wing or rotor blade—can only be generated by the adjustment angle. The wing profiles shown in the other publications in no case assume the shapes represented under pressure: in the region where strings or webs terminate in the wing skin, pressure and tensile forces act together and give the wing skin its final shape. Especially the profile known from U.S. Pat. No. 2,886,265, but to a certain extent the others also, essentially assume under pressure the shape known from DE 949 920, with disappearing $c_A$. Added to this a pneumatic wing is poorly suited for the attachment of control cables or rods, especially for moving the aileron. All the proposed ailerons are entirely copied from those of rigid wing structures and do not represent any technical advance.

What is lacking in all the quoted documents is the intrinsic technical knowledge of how to produce the overall profile, which poses the question as to whether such profiles were ever built, not to mention whether they were then flown.

The problem which is to be addressed by the present invention, exists on the one hand in the production of a pneumatic wing with a prescribed profile and a predetermined lift coefficient $c_A$, with an attached pneumatic aileron which avoids control wires or rods, and on the other, the wing profile, as a whole or in part, should be modified and optimised with respect to the flight speed by the application of elements inflated with compressed air. The usable speed region is thus increased overall.

The solution of the task set is addressed in the characterising part of patent claim 1 with regard to the main characteristics of the device, in patent claims 2 to 26 regarding further advantageous and identifying characteristics: the invention is more closely described using the attached drawings.

Shown are

Figure 2:
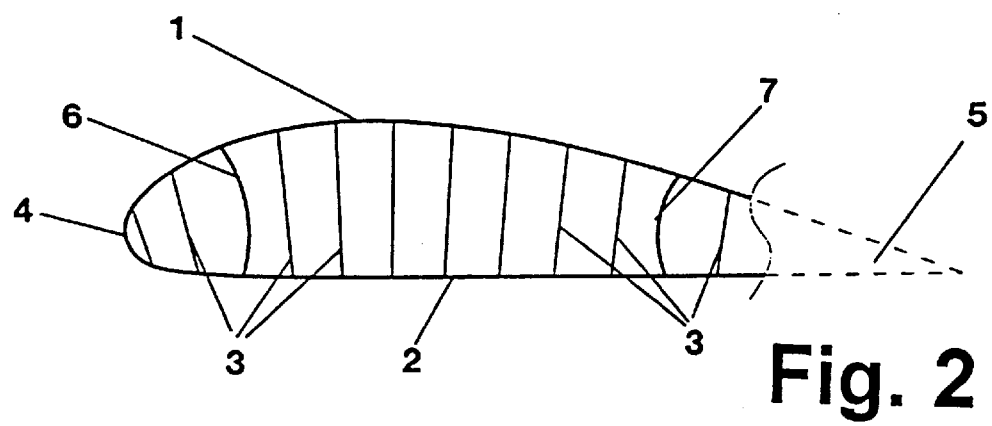
Figure 3:
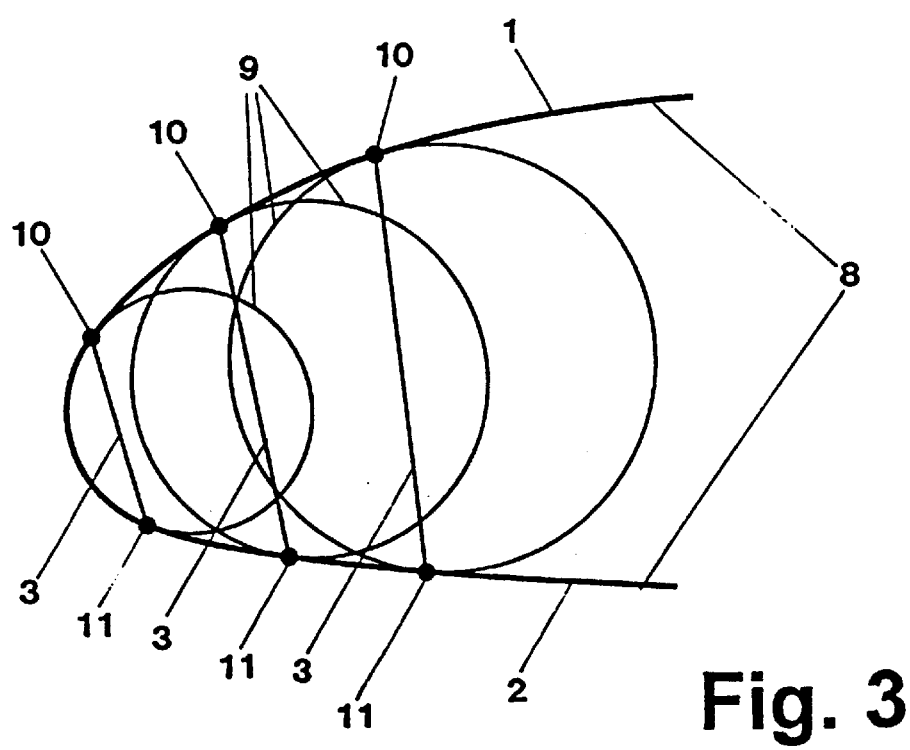
Figure 4:
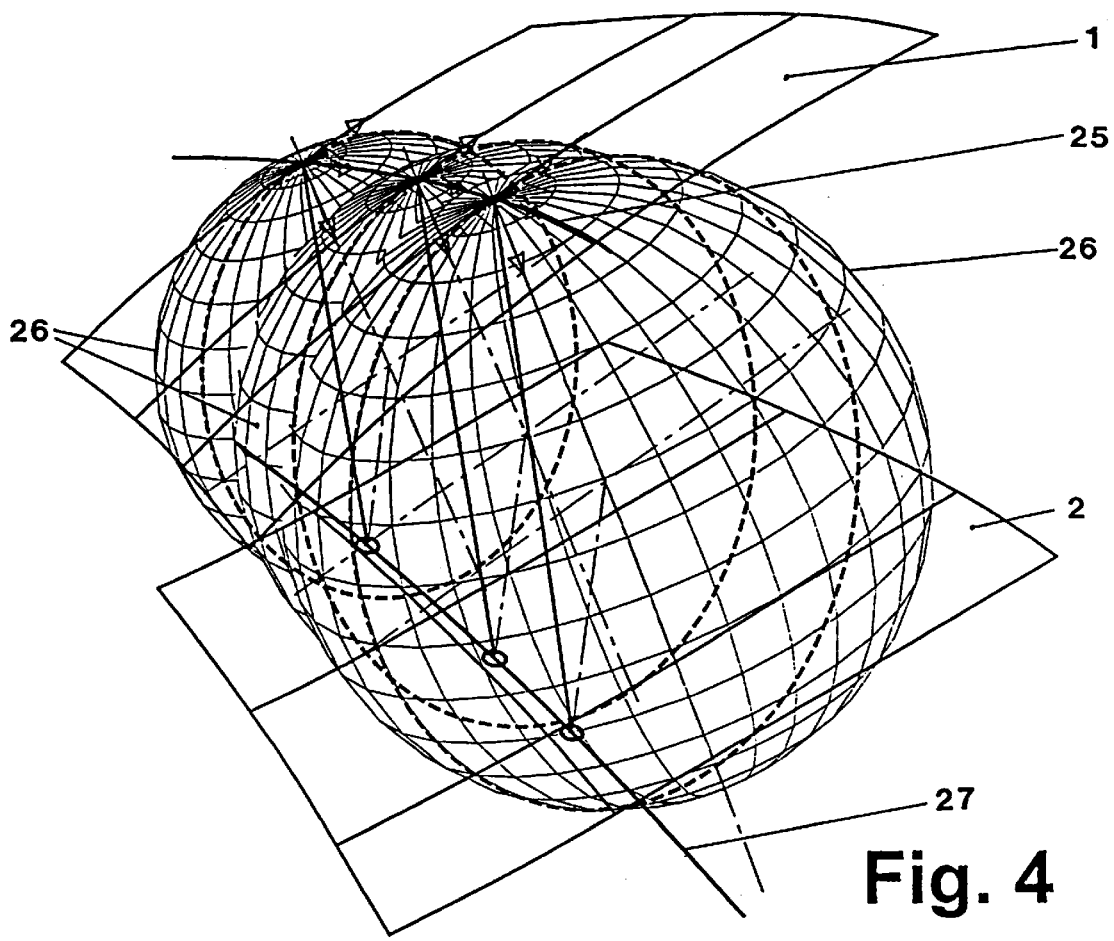
Figure 11:
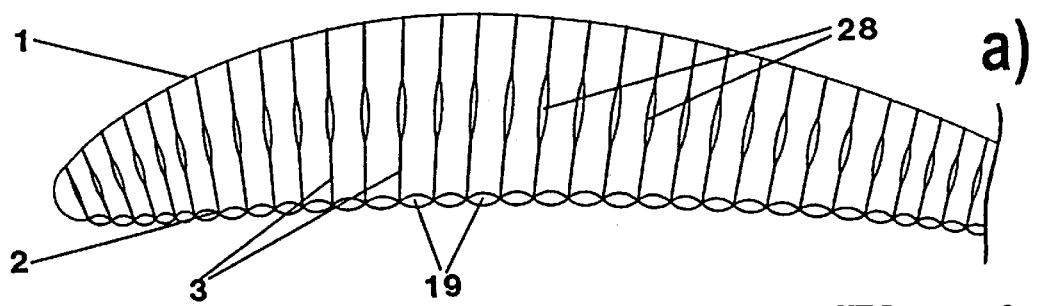
Figure 11:
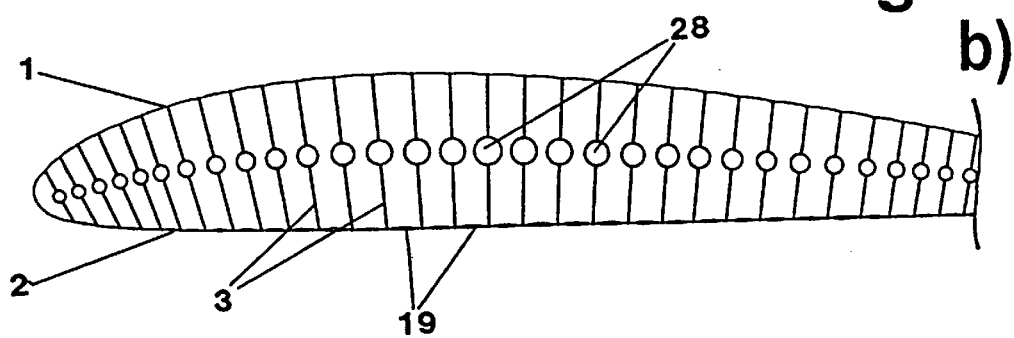
Figure 5:
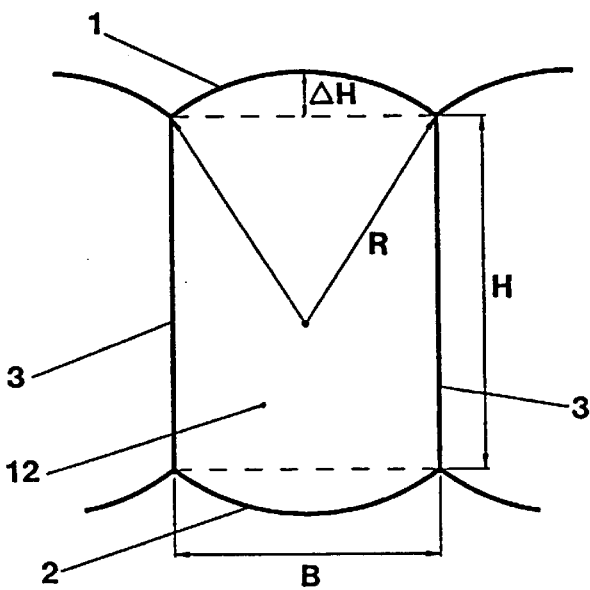
Figure 6:
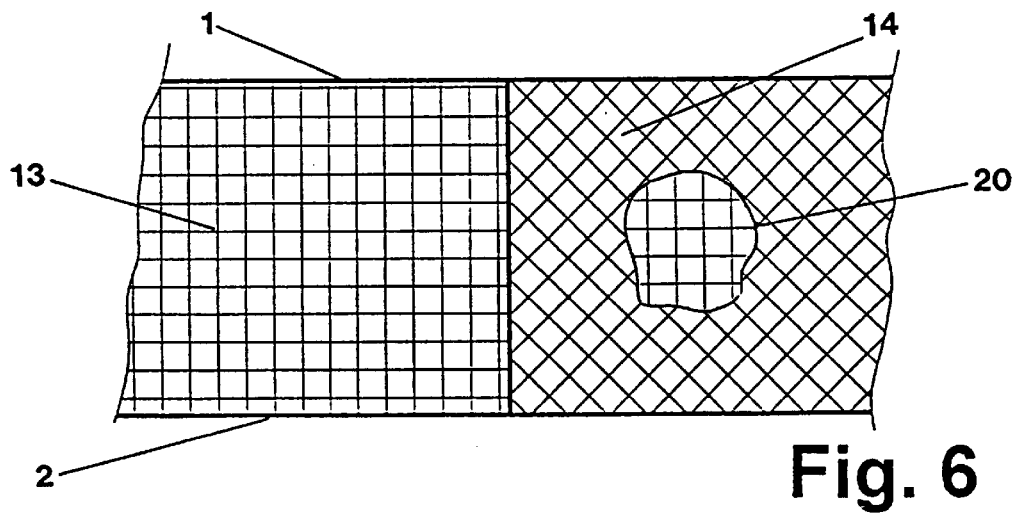
Figure 7:
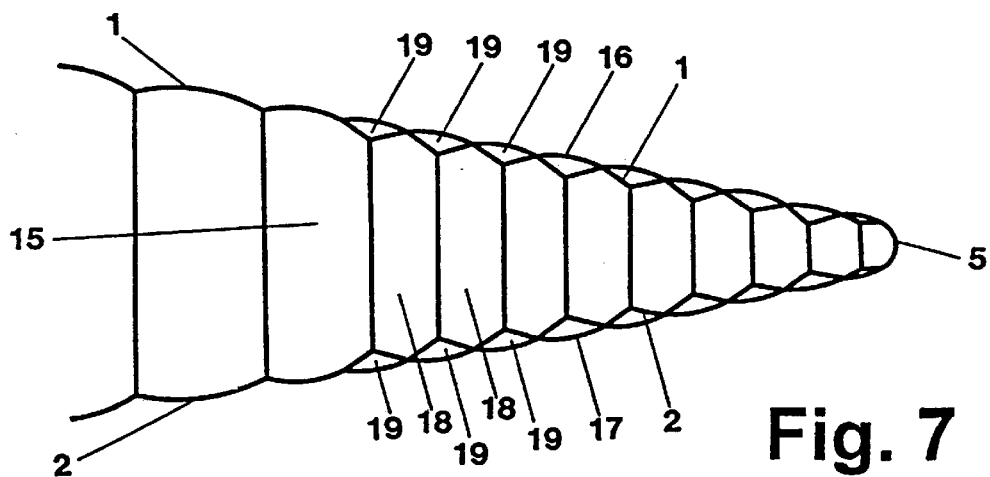
Figure 8:
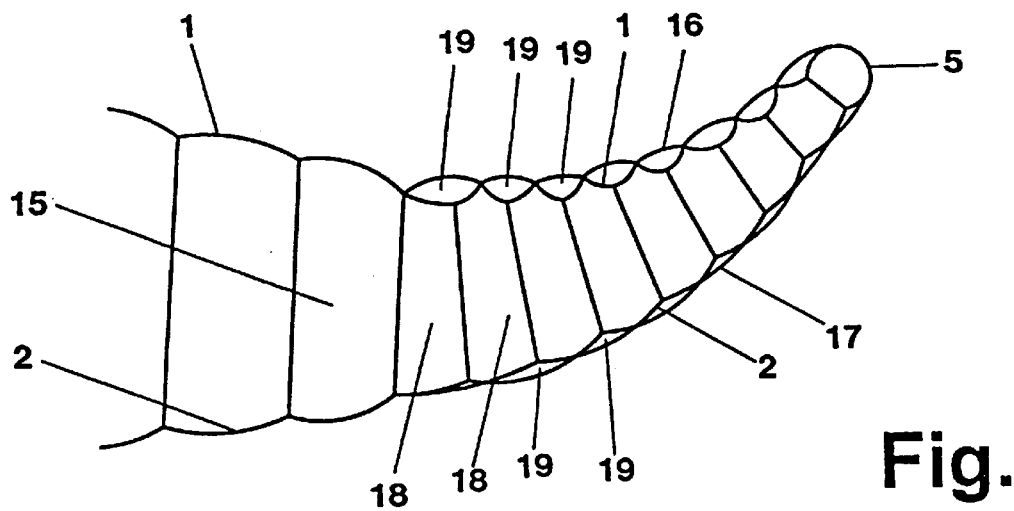
Figure 9:
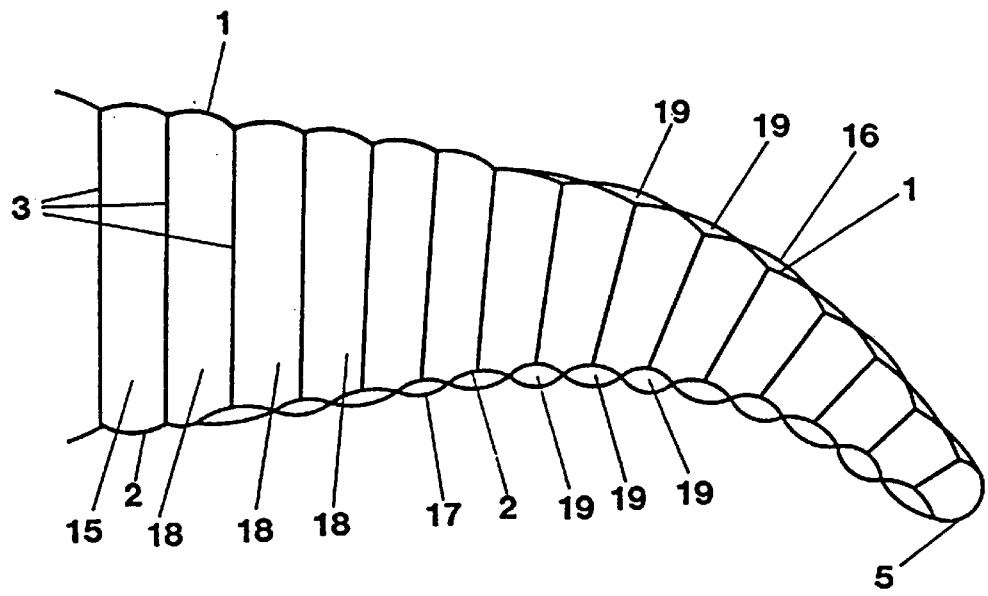
Figure 10:
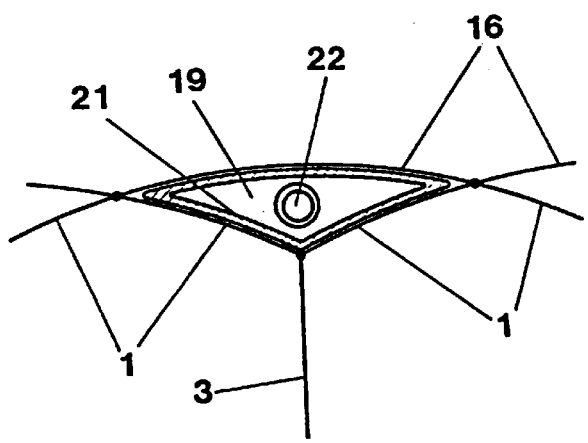
Figure 12:
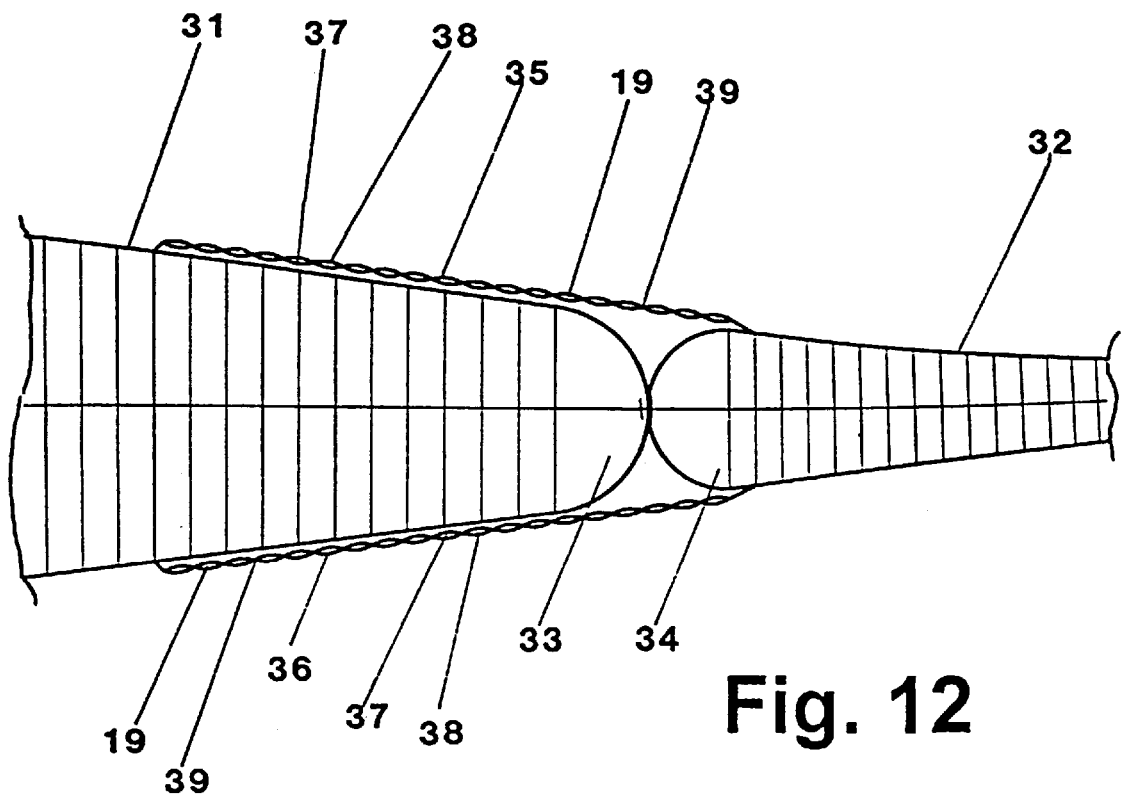
Figure 13:
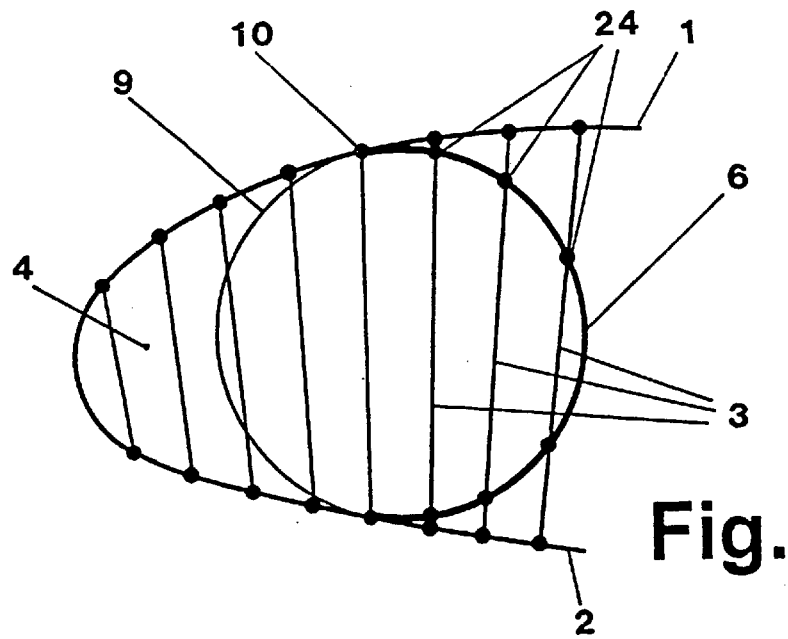

FIG. 1 a first section running essentially in the direction of the air flow through a non-adaptive wing in accordance with the invention, without the aileron area, FIG. 2 the same section as in FIG. 1, however in a second example of construction, FIG. 3 an important step in the production of the wing with small changes to the wing profile per unit of length in the longitudinal axis, FIG. 4 the process shown in FIG. 3 with a greater change of the wing profile per unit of length in the longitudinal axis, FIG. 5 a section through a cell of the wing, FIG. 6 a longitudinal section through a cell with an advantageous further development, FIG. 7 a first section through the trailing edge of the wing in the neutral position, FIG. 8 a second section through the trailing edge of the wing in an upwards setting, FIG. 9 a section through the trailing edge of the wing in an asymmetrical construction, FIG. 10 a detail of a modification of FIG. 7, 8 or 9, FIG. 11a,b an overall adaptive wing without the aileron area, FIG. 12 a further modification of the operation of the aileron, FIG. 13 a modification of FIG. 2.

FIG. 1 shows a section running in the direction of the air flow through a wing in accordance with the invention, but not, however, adaptive. This has an airtight skin, divided into upper skin 1 and lower skin 2. Between them run a plurality of textile webs 3, which, for instance, comprise webbed material with little extensibility; aramid thread webbing may be cited as an example of material, although newer high tensile and low stretch materials are now appearing on the market. The textile webs 3 permit the passage of air and can, for more rapid equalisation between the cells formed by them, even have holes. On the other hand individual cell webs 3 can be made airtight, so that any accidental loss of pressure does not affect the whole wing. The hollow body formed from the upper and lower skin 1, 2 and the textile webs 3 is flat in its non-inflated condition and can be easily folded or rolled. In the inflated condition it assumes the shape shown schematically in FIG. 1, whereby the upper and lower skins 1, 2 obviously swell out between the webs 3, as is more closely described under FIG. 5.

The peripheral or tensile stress $\sigma_z$ of the upper and lower skin 1, 2 is determined by the heights H of the webs 3, since for any point on the wing $$\sigma_z \approx \frac{\Delta \text{pH} \cdot L}{2L} = \frac{\Delta p \cdot H}{2} \text{ applies,}$$

where $L$ = Length of the web in question $\Delta p$ = Internal pressure in the wing.

From this it is obvious, that the stress $\sigma_z$ reduces with lowering wing thickness, thus on the leading and trailing edges 4, 5, eventually below a value which can be used for the stability and carrying power of the wing.

FIG. 2 shows a measure in accordance with the invention, by which this fact can be opposed: at a certain distance from the leading and trailing edges 4, 5 an airtight web 6, 7 is introduced, which allows that part of the wing which lies in front of the web 6 and that behind the web 7 to be subject to a greater pressure $\Delta p_2$ than the central part of the wing, which is subject to pressure $\Delta p_1$, as is shown in FIG. 2. Obviously it is possible for each cell defined by the web 3 to be inflated with its own pressure, which requires airtight webs 3. This however requires individual compressed air supplies for the individual cells.

FIG. 3 is a first representation of the production process for the determination of the position and attitude of the webs 3. This is applied in wings or wing sections, in which the profile variation per unit of length in the direction of the wing axis is relatively small or absolutely nil. In order to keep the drawing simple, many fewer webs 3 are included than are in fact necessary. If the target profile of the wing is—in several sections analog to the representation in FIG. 1—determined by the sought after flight characteristics, then this results in a wing envelope 8. In this a family of locus circles 9 can be inserted, which touch the upper and lower skins 1, 2, i.e. the envelope 8, at each of two points 10, 11. The points 10, 11 obtained in this way are—in the profile section under consideration—the attachment points of the webs 3. In accordance with the invention this has the effect that the wing, when under pressure actually assumes the intended shape but in the slack condition is prepared for processing, since the angle between the web 3 and the envelope 8 is the same at both of the points 10, 11. Thereby the resulting force components both in the upper and lower skins 1, 2, and also in the web 3 under consideration are always essentially the same as mirror images. Because of the construction of the webs 3 in FIG. 3 the coordinates of the points of contact 10, 11, which are at the same time the contact points on the envelope 8 with the level of the webs 3 can be exactly calculated. In the same way the heights H of the webs 3 are known. From this can be constructed both the dimensions of the fabric web used for the webs 3, and also the positions of the lines along which the webs 3 should be attached to the envelope.

If an already airtight weave is used for the envelope 8, the lines of sewing are then sealed with a plastics material which is self binding to the plastics material to be sealed. If the envelope 8 is only sealed after the sewing of the webs, then this occurs for instance in accordance with known processes of plastics lamination of woven materials.

At the position of a sewn joint it is possible according to the invention to use welding also. There are several modifications foreseen here:

Either the textiles used are directly weldable; the webs 3 are then for instance bent over by about 90° at their upper and lower edges and the strips thus formed are welded to the upper and lower skins 1, 2 thermally or using ultrasound. If on the other hand the textile materials cannot be welded directly, then the above mentioned strips, formed by bending over, can be coated with plastics material before bending and then welded, using one of the named processes, to the previously plastics laminated upper and lower skins 1, 2.

A third modification according to the invention comprieses of not only preparing the web 3 in the manner described, but also providing the upper and lower skins 1, 2 with plastics strips and then welding the webs 3, using these strips. Finally the whole envelope is laminated airtight.

FIG. 4: If a complete wing or even only a part of one shows a strongly changed profile in the longitudinal direction, then the process of FIG. 3 has to be modified. If the sought after profile is given, then for instance lines of attachment 25 are established for the textile webs 3 on the upper skin 1, corresponding to the necessary bending stiffness of the wing.

Then locus spheres 26 are inserted, which touch the attachment line 25 and the lower skin 2 simultaneously. The family of points of contact of the locus spheres 26 to the lower skin 2 gives the lines of attachment to the lower skin 2 designated with the reference 27.

FIG. 5 is the schematic representation of a cell 12—essentially extending over the length L of the wing—formed by the upper and lower skins 1, 2 and two adjacent webs 3. If the wing volume is put under pressure, then the upper and lower skins 1, 2 swell out, as already stated. These swellings out have the form of a circular arc with radius R, which is determined by the height H of the webs 3 and their distance apart B. In so far as the material of the weave used has only a small; force-dependent extensibility, the height $\Delta H$ of the swelling is dependent only on H and B, and not on the pressure $\Delta p$, as long as $\Delta p > 0$, for the reason that the pressure exerted on the upper and lower skins 1, 2, and also the tensile stress on both, depend linearly on the pressure $\Delta p$. For the stability and carrying capability of the wing, on the other hand, the tensile stress in the webs 3 is decisive. If a wing according to the invention is loaded with the generated lifting forces, then these bending moments operate in the wing root, which essentially reduce the tensile stresses in the upper halves of the webs 3 in the direction of the wing, but however increase them in the lower halves. Whilst exceeding a certain maximum stress in the lower halves of the webs affects the limits of the tensile strength of the material, the loss of tension in the upper halves of the webs 3 leads to collapse of the wing. The resistance to collapse is proportional to the pressure $\Delta p$ and dependent on the height H and the width B of the cells 12.

It is therefore provided in accordance with the invention, that the width B of the cells 12 is reduced with decreasing wing height H, to the extent that the width B of the cells 12 is essentially proportional to their height H. As an advantageous development, the inclusion of the two airtight webs 6, 7, according to FIG. 2 or FIG. 13 is considered, which permits, in the regions of reduced tensile stress in the envelope 8, the pressure $\Delta p$ to be increased, so as to increase both the stability and also the carrying power of the wing.

FIG. 6 shows an advantageous development of a web 3 in the longitudinal direction of the wing; the wing tip is to be imagined to the left, and the wing root to the right. Over the whole length of the web 3 the non-stretching weave used—designated by the reference 13—is assembled so that the run of the threads is on the one hand in the longitudinal direction and, on the other perpendicular to it: The tensile stresses in the webs 3 are thus directly generated by the forces working horizontally and vertically. Near to the wing root the tensile stresses, as detailed in FIG. 4, increase in the lower part of the webs 3, and decrease in the upper. The fabric 13 is supplemented here by a second, similarly non-stretch fabric 14, whose direction of threads is turned, for instance, by 45° against that of the first fabric 13. In the area of the second fabric 14 there is a break 20 shown in the drawing, in which the first fabric 13, lying behind it, is made visible. This arrangement permits an improvement in the exchange of tension between the vertical and horizontal directions and prevents the possible overloading of the lower edge of the webs.

Within the scope of the development according to the invention it is also possible to apply two or more layers of the first or second fabric 13, 14.

FIG. 7 shows in schematic manner the formation of the trailing edge of an adaptive wing. From a cell, marked here with reference 15, both the upper skin 1 and the lower skin 2 are covered by a second skin, designated here 16, 17. These are sewn to the upper and lower skins 1, 2 in each case somewhat in the centre of the width B of the cell 18 following cell 15. Thereby, channels 19 arise over the breadth of the aileron somewhat in the form shown in FIG. 10, whereby it must be taken into consideration that the height $\Delta H$ of the swellings is much exaggerated in the representation.

If the pressure in the cells 18 is of the magnitude $\Delta p$, then that in the channels 19 is essentially of the same magnitude. Thereby the upper and lower skins 1, 2 are deformed into somewhat of a straight line zig-zag in the region of the cells 18 and only the double skins 16, 17 exhibit arc-formed swellings. If then the pressure $\Delta p_2$ in the channels 19 under the double skins 16, 17 is increased, such that $\Delta p_2 > \Delta p_1$, then the swellings in the double skins 16, or 17, enlarge, and swellings arise in the zig-zag stretched upper skin in the direction of the cells 18. The channels 19 are thereby thickened, and—due to the low extensibility of the fabric used—shortened in the direction of the air flow, whereby the wing assumes the shape shown in FIG. 8 in the region of the cells 18. In order to increase the effect the pressure $\Delta p_3$ in the channels 19 on the underside of the wing can be lowered, such that $$\Delta p_2 > \Delta p_1 > \Delta p_3.$$

if the quoted pressures are however adjusted such that $$\Delta p_2 < \Delta p_1 < \Delta p_3,$$

then the swelling of the wing occurs towards downwards.

This configuration of the wing, characterised using FIG. 7, 8, can encompass only a part of or the entire span of a wing. The number of cells 18 affected by this feature is in any case dependent on the selected characteristics of the wing.

In a modification depicted in FIG. 9 the lower double skin 17 extends over more cells 18 than the upper double skin 16. The shape of the wing and thus the $c_A$ value can thereby be changed over a wider range, by increasing the pressure in the lower channels 19. This also changes—solely by the modification of the trailing edge—the optimum speed range of the wing. It is similarly in accordance with the invention to extend the formation of the wing according to FIG. 9 essentially over the whole under side of the wing, if need be in conjunction with a further shape changing facility, such as is shown in FIG. 11a, b.

The formation of the wing according to the invention as in FIG. 7, 8 or 9 is also suitable, if necessary with a reduced number or locally limited distribution of the channels 19, as an aileron. If the channels 19 extend essentially over the whole half-wing, then the aileron displacement required for a given banking of the aircraft can be reduced.

FIG. 10 shows a modification of the construction of the channels 19 described; only one channel 19 is shown as an example; the remainder are constructed similarly. In the channel 19, formed by the space between the upper skin 1 and the upper double skin 16 is inserted a thin walled tube 21 made of elastomer. This tube is closed at its ends; in this instance the pressure tube 22 opens into the channel 19 at the end nearest the wing root. Obviously the pressure tube 22 can be introduced into the elastomeric tube 21 at several locations, so as to accelerate the change of pressure. If the modification shown in FIG. 10 is selected, then the sealing of the upper and lower double skins 16, 17 becomes unnecessary because the sealing function is now taken over by the elastomeric tube 21.

Instead of wires or rods, in this method of construction as described the aileron pressure tubes 22 lead to the wings—directly into the channels 19. Control can be exercised conventionally, for example by means of a control column and—in the modification according to FIG. 9—by a landing flap operation, not however effected by a tensile force in control wires, but a change of pressure in the channels 19.

FIG. 1a, b are representations of an overall adaptive wing. Here the textile webs 3—whose number is reduced in the drawing—each has a channel 28. These channels 28 are constructed similarly to the channels 19 in accordance with FIG. 7, 8, 9 or as pockets 29, as are described under FIG. 10. The under side of the wing is formed as shown in FIG. 9.

In FIG. 11a the channels 19 on the underside of the wing are at high pressure with respect to the inside of the wing, the channels 19 in the webs 3 are almost pressure free or only supplied with pressure to the extent that the webs 3 do not experience any shortening.

If now the pressure in the channels 19 in the webs 3 increases, then the heights of the webs 3 reduce and the whole wing becomes flatter, as shown in FIG. 11b. The change in shape can also be controlled by the size of the channels 19 in the webs, as well as the pressure; in principle each of these channels 19 can be inflated by an individual pressure. If however only a single pressure is to be used, then the size of the channels 19 is the only parameter of the height changing of the profile.

Due to the shortening of the webs the swelling of the wing is however also changed. So as to compensate for an enlargement of the swelling, the channels 19 on the underside of the wing can be released from pressure. In this way the wing becomes smaller with a controllable change of the swelling.

The trailing edge is not shown in FIG. 11a, b. It can be configured according to the representation in FIG. 7. Instead of the version according to FIG. 7 it is however possible—in each example of construction—to foresee a configuration according to FIG. 12.

The wing is constructed here from two initially separated parts, a carrying wing 31 and an aileron 32. The two parts 31, 32 are joined, for instance by welding or gluing—by the outer regions of two cells 33, 34, however over the entire width of the aileron 32. The cells 33 border the carrying wing 31 to the rear, the cells 34 border the aileron to the front. It is assumed that the pressure in cell 33 is higher than that in cell 34 because of the static function of the carrying wing 31. The carrying wing 31 and the aileron 32 are joined by two flat actuators 35, 36, which are in principle built and dimensioned identically. The construction of each actuator 35, 36 comprises in each case a double skin 37, 38, with airtight channels 19, which arise between longitudinal lines 39, along which the double skins 37, 38 are joined. In the neutral position of the aileron 32 both actuators 35, 36 are inflated, so that an average shortening occurs. This has the effect that the aileron 32 is drawn towards the end of the carrying wing 31 and, due to the difference in pressure between the parts 31, 32, the embaying of the cells 34 occurs as shown.

If the aileron has now, for instance, to be pivoted upwards, then the pressure in the upper actuator 35 is increased and that in the lower actuator 36 is decreased. Actuator 35 is thereby shortened, actuator 36 lengthened, which results in the intended deviation of the aileron.

It is important to the invention that the actuators 35, 36 are each joined along a line to the carrying wing 31 and to the aileron 32 and exert line related forces. Instead of the actuators 35, 36 shown in FIG. 12, other line force generating actuators meet the desired objective.

A modification to the example of construction according to FIG. 2 is shown in FIG. 13. The example of construction according to FIG. 2 operates with a prescribed difference of pressure between leading and trailing edges 4, 5 on the one hand and the that part of the wing lying between them on the other. In this the swelling of the webs 6, 7 and also their chords can be determined, so that the wing assumes the prescribed shape. If however the pressure in the leading edge 4, the centre section of the wing and the trailing edge 5 must remain variable, then the modification shown in FIG. 13 is to be preferred. Here only the airtight web 6 in the leading edge is shown. The construction for the trailing edge is completely analog. The airtight web 6 is dimensioned such that it forms part of that locus circle 9 away from the nose of the wing, which is to form the separation from the leading edge 4 and the centre section of the wing. Then the airtight web 6 is penetrated by air permeable webs 3. The jointing of the web 6 to the webs 3 at attachment points 24 is effected by the same process, as is described for the jointing of the webs 3 to the upper and lower skins 1, 2.

What is claimed is:

1. A pneumatic wing for an aircraft, to be filled with compressed air, with a leading edge (4) and a trailing edge (5) which comprises an airtight, textile envelope (8), divided into an airtight upper skin (1) forming the upper covering of the wing and an airtight lower skin (2) forming the lower covering of the wing and a plurality of textile webs (3) joining the upper skin (1) and the lower skin (2), characterised in that:

the webs (3) extend longitudinally of the wing and are spaced apart across the wing in the direction of air flow dividing the wing into longitudinal cells, the webs (3) being secured with the upper skin (1) and the lower skin (2) along longitudinal lines of attachment so that forces generated by the interplay of tensile stress and pressure tensors in the webs (3) and the upper skin (1) and the lower skin (2) give the wing the intended shape; and the wing including air tight cells adapted to change the configuration of the wing to include a form selected from the group consisting of an aileron, a landing flap, and the height and the shape of the wing.

2. A pneumatic wing in accordance with patent claim 1, characterised in that the textile webs (3) are joined to the upper and lower skins (1, 2) by sewing and that the stitches at least are made airtight following sewing.

3. A pneumatic wing in accordance with patent claim 1, characterised in that the textile webs (3), in the area of the joints, and the upper and lower skins (1, 2) at least in the area of the joints are laminated with weldable plastics material and the joint is then made between the upper and lower skins (1, 2) and the textile webs (3) by welding of the joint areas.

4. A pneumatic wing in accordance with Patent claim 1, characterized in that an airtight web (6) is connected between the upper skin (1) and the lower skin (2) spaced from the leading edge (4) of the wing, which permits the wing from the leading edge (4) to the airtight web (6) to be under a higher pressure than the remaining part of the wing.

5. A pneumatic wing in accordance with patent claim 1, characterized in that an airtight web (7) is secured between the upper skin (1) and the lower skin (2) spaced from the trailing edge (5) of the wing, which permits the wing between the airtight web (7) and the trailing edge (5) to be under a different pressure than the remaining part of the wing.

6. A pneumatic wing in accordance with patent claim 1, characterised in that the textile webs (3, 6, 7) are manufactured from low-stretch material (13), whereby the run of the threads of the fabric (13) is directed essentially parallel and perpendicular to the surface of the wing.

7. A pneumatic wing in accordance with patent claim 6, characterised in that the fabric (13) of a web (3, 6, 7) is doubled at least in the region of the wing root, by a further fabric (14), whereby the second fabric (14) lies closely onto the first fabric (13) and is sewn to it together with the lower and upper skin (1, 2), whereby the run of the threads of the second fabric is turned by about 45° in relation to the first fabric (13).

8. A pneumatic wing in accordance with patent claim 7, characterised in that more than one first fabric (13) is provided per web (3, 6, 7).

9. A pneumatic wing in accordance with patent claim 7, characterised in that more than one second fabric (14) is provided per web (3, 6, 7).

10. A pneumatic wing in accordance with patent claim 1, characterised in that the attachment lines of the webs (3) to the upper skin (1) and the lower skin (2) are found where there is a small variation of the wing profile in the longitudinal direction of the wing, so that they are given by the points of contact (10, 11) of locus circles (9) inserted into the wing profile.

11. A pneumatic wing in accordance with patent claim 1, characterised in that the attachment lines of the webs (3) to the upper skin (1) and the lower skin (2) are found where there is a large variation of the wing profile in the longitudinal direction of the wing, so that they are given by the points of contact (10, 11) of locus spheres (26) inserted into the wing profile.

12. A pneumatic wing in accordance with patent claim 1, characterised in that the means of converting parts of the wing to landing flaps by the application of compressed air comprise the addition of a double skin (16, 17) over the area of the landing flaps to the upper skin (1) and the lower skin (2), which is joined essentially in each case centrally between two webs (3) to the upper skin (1) on the one hand, and to the lower skin (2) on the other hand, whereby between the upper skin (1) and the upper double skin (16) on the one hand, and between the lower skin (2) and the lower double skin (17) on the other hand, channels (19) are formed along the landing flap region, which can be inflated by compressed air, whereby their pressures $\Delta p_2$, $\Delta p_3$, can deviate from the pressure $\Delta p_1$ reigning in the wing.

13. A pneumatic wing in accordance with patent claim 1, characterised in that the means of converting parts of the wing to ailerons by the application of compressed air comprise the addition of a double skin (16, 17) over the area of the ailerons to the upper skin (1) and the lower skin (2), which is joined essentially in each case centrally between two webs (3) to the upper skin (1) on the one hand, and to the lower skin (2) on the other hand, whereby between the upper skin (1) and the upper double skin (16) on the one hand, and between the lower skin (2) and the lower double skin (17) on the other hand, channels (19) are formed along the aileron region, which can be inflated by compressed air, whereby their pressures $\Delta p_2$, $\Delta p_3$, can deviate from the pressure $\Delta p_1$ reigning in the wing.

14. A pneumatic wing in accordance with patent claim 12, characterised in that the lower double skin (17) extends over a greater number of webs (3) than the upper double skin (16).

15. A pneumatic wing in accordance with patent claim 13, characterised in that the upper double skin (16) extends over the same number of webs (3) as the lower double skin (17).

16. A pneumatic wing in accordance with patent claim 12 or 13, characterised in that the region of the pneumatic wing which has double skins (16, 17) encompasses only a part of the span width of the wing.

17. A pneumatic wing in accordance with patent claim 12 or 13, characterised in that the region of the pneumatic wing which has double skins (16, 17) encompasses essentially the whole the span width of the wing.

18. A pneumatic wing in accordance with patent claim 1, characterised in that the means of changing both the height and also the shape of the wing by the application of compressed air comprise that essentially the whole lower skin (2) of the wing is provided with a double skin (17), essentially all the textile webs (3) are manufactured with regions of double walls so that lengthwise running channels (19) result, which can be inflated with compressed air, and that height and shape changing of the wing can be effected by the combined working of pressure changes in the channels (19) on the underside of the wing and the channels (19) in the webs (3).

19. A pneumatic wing in accordance with patent claim 18, characterised in that the channels (19) in the webs (3) have the same pressure.

20. A pneumatic wing in accordance with patent claim 18, characterised in that the channels (19) in the webs (3) are supplied with different pressures.

21. A pneumatic wing in accordance with patent claim 1, characterised in that in the region of the trailing edge of the wing a part of the wing is similarly constructed to the remainder, however is separated from it in the pressure sense and has a lower pressure, the wing is thereby divided into a carrying wing (31) and an aileron (32), rearmost cells (33) of the carrying wing are joined to foremost cells (34) of the aileron (32) only in a narrow region, however extending over the whole length of the aileron (32), that an upper actuator (35) and a lower actuator (36) are provided, the upper actuator (35) is fastened to the upper skin (1) of the carrying wing (31) and to that of the aileron (32) over the whole length of the aileron (32), the lower actuator (36) is fastened to the lower skin (2) of the carrying wing (31) and to that of the aileron (32) over the whole length of the aileron (32), the actuators (35, 36) each comprise a double skin (37, 38), which are joined together along longitudinal lines (38) and have channels (19) between the longitudinal lines, which can be inflated with pressure, whereby the actuators (35, 36) shorten in the direction of the air flow of the wing by the application of compressed air.

22. A pneumatic wing in accordance with patent claims 12, 13, 18, 19, 20, or 21, characterised in that the channels (19) are connected to compressed air lines, through which the pressure in the channels (19) can be matched to the flight requirements.

23. A pneumatic wing in accordance with any one of patent claims 12, 13, 14, 15, 18, or 21, characterised in that the double skins (16, 17, 37, 38) are laminated with plastics material so as to be airtight.

24. A pneumatic wing in accordance with any one of patent claims 12, 13, 14, 15, 18, 19, 20, or 21, characterised in that for each channel (19) an airtight elastomeric tube (21), hermetically sealed at each end, is provided, which is positioned lengthwise in the channel (19) and essentially has the same dimensions as it, a pressure tube (22) opens into the elastomeric tube (21), which can be inflated with compressed air thereby, the double skins (16, 17, 37, 38) are not airtight.

25. A pneumatic wing in accordance with patent claim 12, characterised in that the double skins (16, 17) are sewn to the upper and lower skins (1, 2).

26. A pneumatic wing in accordance with Patent claim 12, characterised in that the double skins (16, 17) are welded to the upper and lower skins (1, 2).

27. A pneumatic wing for an aircraft in accordance with claim 1 including air permeable webs (3).

28. A pneumatic wing for an aircraft in accordance with claim 1 including airtight webs (3).

29. A pneumatic wing for an aircraft in accordance with claim 1 where the webs (3) include both air permeable and airtight webs.

30. A pneumatic wing for an aircraft in accordance with claim 1 where the distance B between webs (3) is essentially proportional to the height of the wing at each of the webs (3).

31. A pneumatic wing in accordance with claim 16, characterized in that the double skins (16, 17, 37, 38) are laminated with plastics material so as to be airtight.

32. A pneumatic wing in accordance with claim 17, characterized in that the double skins (16, 17, 37, 38) are laminated with plastics material so as to be airtight.

33. A pneumatic wing in accordance with claim 16, characterized in that for each channel (19) an airtight elastomeric tube (21), hermetically sealed at each end, is provided, which is positioned lengthwise in the channel (19) and essentially has the same dimensions as it, a pressure tube (22) opens into the elastomeric tube (21), which can be inflated with compressed air thereby, the double skins (16, 17, 37, 38) are not airtight.

34. A pneumatic wing in accordance with claim 17, characterized in that for each channel (19) an airtight elastomeric tube (21), hermetically sealed at each end, is provided, which is positioned lengthwise in the channel (21) and essentially has the same dimensions as it, a pressure tube (22) opens into the elastomeric tube (21), which can be inflated with compressed air thereby, the double skins (16, 17, 37, 38) are not airtight.

* * * * *